United States Patent Office.

J. B. NEWBROUGH AND EDWARD FAGAN, OF NEW YORK, N. Y.

Letters Patent No. 73,917, dated January 28, 1868.

IMPROVED MATERIAL PRODUCED BY TREATING CAOUTCHOUC AND OTHER GUMS.

The Schedule referred to in these Letters Patent and making part of the same.

TO ALL WHOM IT MAY CONCERN:

Be it known that we, J. B. NEWBROUGH and E. FAGAN, of New York city, have invented an Improved Material, produced by treating caoutchouc and other gums; and we do hereby declare the following to be a full, clear, and exact description of the manner in which the same is made.

Sulphur is treated by boiling it in turpentine or equivalent oil, a portion of which will be decomposed, and will settle, with the sulphur, to the bottom of the vessel in which the materials are treated. The oil is then poured off, and the solid matter which remains is washed with dilute sulphuric acid, and is dried at a low heat.

Iodine is treated, in the same manner as the sulphur, with oil, to which sulphuric acid has been added, to prevent the formation of an explosive composition.

Equal proportions of the prepared sulphur and iodine are melted together, and the composition, after cooling and hardening, is thoroughly incorporated with caoutchouc or equivalent gum, in the proportion of about three ounces of the composition to one pound of the gum.

The gum thus prepared may be moulded or otherwise formed of any desired shape, after which it is introduced into an oven, the temperature of which, during the first fifteen minutes, is raised to 320° Fahrenheit. This temperature is maintained for five minutes, and is then quickly lowered to 250°, at which it remains for about an hour, or until the composition is hard.

Any color imparted to this composition, by the mixture with the same of suitable earthy or mineral matter, will not be changed by the hardening process, so that no difficulty is experienced in obtaining a product of almost any desired color; and as but a comparatively low heat is required to harden the composition, the gum is not weakened or injured by the operation in any degree.

The product thus obtained is hard, tough, and durable, is not affected by nitro-sulphuric or other acid, and is applicable to many useful and ornamental purposes.

We claim as our invention, and desire to secure by Letters Patent—

The within-described new manufacture or substance, consisting of caoutchouc or equivalent gum incorporated with iodine and sulphur, (after treating the said iodine and sulphur substantially as specified,) and subjected to heat.

In testimony whereof, we have signed our names to this specification, in the presence of two subscribing witnesses.

J. B. NEWBROUGH,
E. FAGAN.

Witnesses:
CHARLES E. FOSTER,
C. P. HARTT.